Nov. 1, 1949 — R. E. FOSTER — 2,486,739

DEVICE FOR WINDING FISH POLES

Filed May 23, 1947

Inventor
Ray E. Foster

By McMorrow, Berman & Davidson
Attorneys

Patented Nov. 1, 1949

2,486,739

UNITED STATES PATENT OFFICE 2,486,739

DEVICE FOR WINDING FISH POLES

Ray E. Foster, Craig, Colo.

Application May 23, 1947, Serial No. 750,058

4 Claims. (Cl. 242—7)

The device of the present invention relates to means for applying winding threads to desired areas of fishing rods or poles.

Commonly, fishing poles are wound by hand. This takes a great deal of patience and time.

In accordance with the principles of the invention, a holder is provided for the fishing pole so that the pole is positioned horizontally. The winding thread is taken off a spool, passed through a tensioning device, and fixed to the fishing pole. It is then merely necessary to turn the fishing pole until the desired areas have been covered.

The accompanying drawings illustrate a preferred embodiment of the invention, but it is understood that variations may be made therein without departing from the spirit of the invention as hereinafter claimed.

Figure 1 shows a perspective view of the new and improved winding device.

Figure 2 is a vertical section taken along the line 2—2 of Figure 1.

The device comprises a frame 10 made of metal or other material. The frame 10 includes four feet 11, 12, 13, and 14, two horizontal sides 16 and 17, and two ends 18 and 19. Each of the ends 18 and 19 extends upwardly from the legs or feet, and includes a central depressed portion 21 or 22, for a purpose to be described more fully hereinafter.

A horizontal rod 24, parallel to the sides 16 and 17, joins the ends 18 and 19 on one side of the depressed portions 21 and 22, as shown most clearly in Figure 1 of the drawings.

A hollow tube 25 is adapted to slide horizontally on the rod 24. This tube 25 is approximately half the length of the rod 24, to permit substantial relative movement of the tube 25. The tube 25, in addition to being slidable along the rod 24, is also rotatable thereon.

Extending from one end of the tube 25 is an arcuate brace 27, and extending from an intermediate portion of the tube 25 is an S-shaped finger 28. A horizontal arm 29 joins the ends of the brace 27 and the finger 28. A counterweight 31 extends outwardly from the joint of the arm 29 and the finger 28. The brace 27 and finger 28 are of such length that when they are swung counter-clockwise, as shown in Figure 1, the arm 29 and the counterweight 31 will be positioned outside of the side member 16.

Projecting upwardly from the arm 29 is a post 32 for holding a spool of thread. The post 32 is positioned between the brace 27 and the finger 28. Projecting upwardly from the near end of the arm 29 is a thread-tension control 34.

In the operation of the device, a fishing pole 30 is horizontally positioned in the central depressed portions 21 and 22 of the ends 18 and 19. The tube 25 is then turned counter-clockwise, and the counterweight 31 will keep the fishing pole 30 in position underneath the brace 27 and the finger 28. A spool of thread is mounted on the post 32, and the thread is passed through the tension control 34 and anchored on the fishing pole 30. The fishing pole 30 may then be manipulated to wind the thread thereon to the desired extent. As the work progresses, the pole 30 may be moved longitudinally, or the tube 25 may be slid on the rod 24, or both the fishing pole 30 and the tube 25 may be moved longitudinally.

I claim:

1. A thread-winding device, comprising a horizontal support for the work on which the thread is to be wound, a horizontal rod on said support, clamping means slidably and rotatably mounted on said rod for clamping the work on the support, a counterweight on said clamping means for holding the work in clamped position, and means on said clamping means for supporting the winding thread.

2. A device for winding thread on a fishing pole, comprising a frame having two depressed portions adapted to accommodate the fishing pole horizontally, a horizontal rod on said frame parallel to the position of the fishing pole, a tube slidable and rotatable on said horizontal rod, a finger extending outwardly from said tube and adapted in one position of the tube to clamp the fishing pole in place in said depressed portions, a counterweight at the outer end of the said finger for retaining said finger in clamping position, and means supported by said tube for holding and tensioning the thread to be wound on the fishing pole.

3. A device for winding thread on a fishing pole or the like, said device comprising a frame adapted to rest upon a horizontal support, said frame comprising longitudinal side portions terminating at their ends in feet for engaging the support, transverse portions connecting said longitudinal side portions, said transverse portions being formed with longitudinally aligned depressions in which the fishing pole is adapted to rest longitudinally upon said frame and be rotated axially relative to said frame, a longitudinal slideway on said frame at one side of said depressions, a slide slidably and rotatably mounted on said slideway, lateral arm means projecting laterally from said slide, said slide and arm means together constituting clamping means arranged to be swung toward one side of said frame to permit placing the pole in said depressions and to be swung toward the opposite side of said frame to overlie and retainably rest upon a pole positioned in said depressions so as to hold the pole in place therein, and thread supporting means on the laterally outward end of said lateral arm means.

4. A device for winding thread on a fishing pole or the like, said device comprising a generally horizontal frame adapted to rest upon a horizontal support, said frame comprising a pair of laterally spaced longitudinal rods, transverse rods extending between and connected to related end portions of said longitudinal rods, said transverse rods having centralized longitudinally aligned depressions acting as rests for a fishing pole, a third longitudinal rod extending between and connected to said transverse rods at one side of said depressions, a slide mounted for movement along and rotation about said third longitudinal rod, longitudinally spaced arms projecting laterally outwardly from said slide, connecting means extending between and connecting the outward ends of said arms, said means, said lateral arms and said slide constituting clamping means arranged to be swung on said third longitudinal rod to overlie and rest upon a pole positioned in said depressions whereby the pole is held in place therein to be axially rotated to wind thread thereon, and thread supporting means on said connecting means.

RAY E. FOSTER.

REFERENCES CITED

The following references are of record in the file of this patent:

UNITED STATES PATENTS

| Number | Name | Date |
|---|---|---|
| 730,427 | Wilson et al. | June 9, 1903 |
| 2,430,892 | Tirrell | Nov. 18, 1947 |

FOREIGN PATENTS

| Number | Country | Date |
|---|---|---|
| 336,214 | Germany | Dec. 19, 1919 |